Oct. 13, 1959  G. E. BRANSTROM  2,908,795
HEATING DEVICES
Filed March 3, 1955
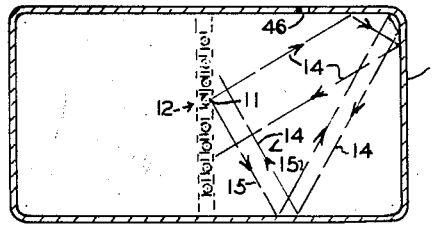
FIG. 1
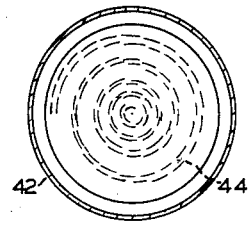
FIG. 2
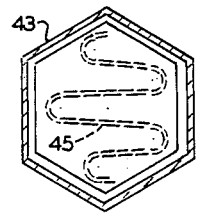
FIG. 3
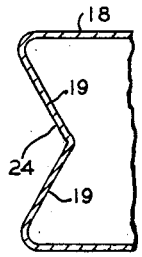
FIG. 5
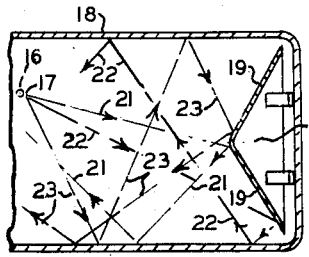
FIG. 4
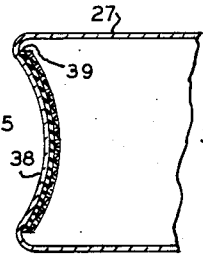
FIG. 7
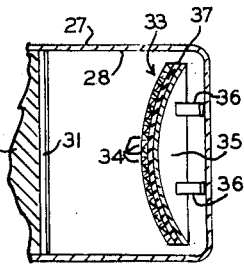
FIG. 6
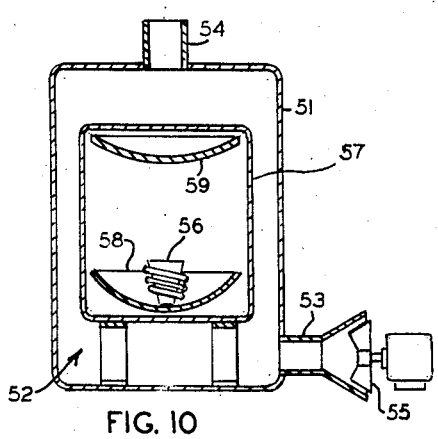
FIG. 10
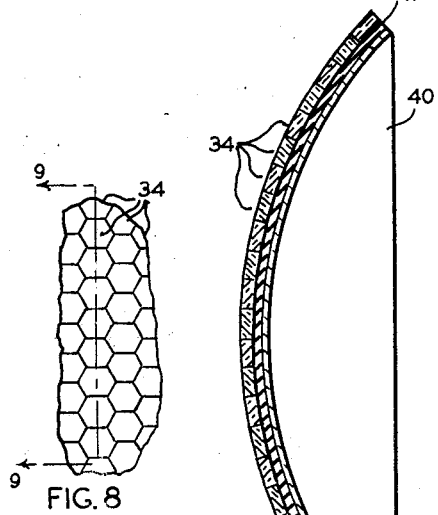
FIG. 8
FIG. 9
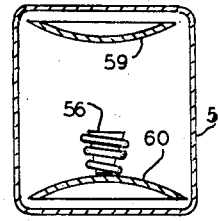
FIG. 11
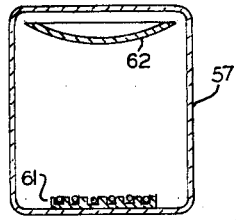
FIG. 12
INVENTOR.
GEORGE E. BRANSTROM
BY
ATTORNEY

United States Patent Office 2,908,795
Patented Oct. 13, 1959

2,908,795

HEATING DEVICES

George E. Branstrom, Chicago, Ill.

Application March 3, 1955, Serial No. 491,932

7 Claims. (Cl. 219—34)

The present invention relates to heat exchanging devices, and particularly is devoted to the problems presented by obtaining efficient transfer of heat energy emitted in radiant form from a source, to a medium to be heated.

It is well known that radiant heat energy freely travelling through a medium that offers little resistance, as a vacuum or a fluid, either gaseous or liquid, is essentially non-useful, since even ponderable mediums, gas or liquid, absorb a percentage of the energy that is very minor with resultant increase in temperature of the medium being very limited, and consequently such a medium is not efficiently heated by exposing it to radiant heat rays. As a means of increasing efficiency of transfer of heat from a radiant source to a medium to be heated it has been the practice to provide a heat-absorbing solid body provided with a heat energy-intercepting surface upon which the radiant heat rays impinge, and which abstracts from them a substantial percentage of their heat energy, thereby heating the solid from which the heat ray may be conductively extracted by the medium to be heated, whether or not that medium is the final medium to be heated or serves for heat transfer to another location of final utilization of the heat.

In accordance with the conventional theory of radiant heat absorption by a solid body, it has been the practice to provide the surface exposed to the radiant heat energy with as highly absorptive quality as possible, and such surfaces uniformly have been regarded as most suitable for heat absorption if dark colored and of dull finish, the theory possibly being that by reduction of reflection of the impinging radiant energy its transfer to the body by absorption is enhanced, and in any event it being known that such a surface is very efficient in conductive transfer of heat to or from a solid body. It is known that such dark, dull heat-absorbing bodies are very inefficient in abstracting heat energy from impinging radiant rays. Possibly their inefficiency is due to dispersive reflection by the microscopically irregular surface that provides the dullness, or to direct transmission of radiant energy through the solid and its reradiation and useless dispersion from the opposite side.

The present invention is based on an opposite concept, that of abstracting energy of radiant heat rays in useful form, and raising temperature of a solid structure, by repeatedly reflecting the radiant energy from and between highly reflective surfaces with which the absorbing structure is provided. This is readily accomplished by enclosing the radiant heat energy source in a closed casing having an internal highly reflective surface system, various portions of which are so related as to provide a large number of reflections of the radiant energy rays emitted by the source. A possible theoretical explanation of the arrangement is that heat energy transfer from radiant form to usable heat content of a solid body (temperature rise of the latter) is accomplished primarily by impact of the radiant energy on the body surface, that energy transfer by a single impingement is of a minor percentage of the total energy content of the radiant heat ray, and that, by multiple impingements, in the present invention provided for by a large number of successive reflections of the radiant energy, a cumulative transfer of minor percentages totals a much larger energy transfer than can be accomplished by the most efficient absorption surface of conventional dull and dark finish.

Whatever may be the true explanation of the invention, it has proven feasible, and experiment has shown conclusively that a markedly more efficient transfer of heat energy from a radiant heat emitter to a casing structure enclosing the latter is accomplished when the casing is provided with an internal highly reflective surface system, arranged to provide for a large number of successive reflections of a major portion of the emitted heat rays, than when the casing is provided with highly absorptive non-reflective internal surfaces.

There are some physical structural limitations encountered in arrangement of a heat exchanger embodying the invention. While it is desirable, for purposes of extraction by the casing of a relatively large percentage of heat energy radiated by the source, to make all internal casing surfaces highly reflective, for purposes of efficient transfer of heat so extracted by the internal reflective surfaces, the structure carrying those surfaces should be arranged as far as is practical for rapid absorption and conduction of the heat to a location of transfer to a medium to be heated, so the casing should be arranged to accomplish that rapid conduction. Additionally, the reflective surfaces, and the structure supporting them, should be capable of indefinitely withstanding prolonged high temperature conditions without physical destruction or distortion, substantial impairment of reflective characteristics, or relative disarrangement of the different surface portions that are productive of the multiple successive reflections of radiant heat energy upon which the invention is based.

A primary object of the invention is provision of a novel heat exchange system for extraction of heat energy from radiant heat waves emitted by a source, with efficiency that is markedly improved as compared to conventional devices for accomplishing the same general purpose.

Another object is the provision of a noval relative arrangement of radiant heat source and a system of reflective surfaces, for efficient abstraction of a relatively large percentage of the heat energy emitted in radiant form by the source.

An additional object is the provision of a novel type of structural arrangement of a heat exchanger assembly, providing for the above-noted high efficiency abstraction of radiant heat energy, employment of that abstracted enery through absorption by, and temperature rise of the physical structure of the assembly, an efficient conductive transfer through the structure and to a medium of the energy so absorbed and appearing in the structure as usable heat.

In the accompanying drawings:

Fig. 1 is a highly schematic diagram of the median axial section of an elementary and simple heat exchanger device arranged in accordance with a basic concept of the invention.

Figs. 2 and 3 are schematic cross-sections showing two possible cross-sectional arrangements that may be employed in such devices.

Fig. 4 is a fragmentary axial section of an improved version of a heat exchanger arranged according to the invention.

Fig. 5 is a similar fragmentary section showing a modified arrangement thereof.

Fig. 6 is a fragmentary axial median section of a highly developed, practical and preferred heat exchanger structure arranged in accordance with the invention.

Fig. 7 is a view similar to Fig. 6, showing a modified arrangement.

Fig. 8 is a fragmentary elevation showing a section of an end reflector assembly that may be employed in the assembly of Fig. 6.

Fig. 9 is a section on line 9—9 of Fig. 8.

Fig. 10 is a vertical median section of an air heating assembly with a heat abstracting device arranged according to the invention.

Fig. 11 is a median axial section of a modified heat abstracting arrangement.

Fig. 12 is a similar view of another modified heat abstracting arrangement.

Describing the drawings in detail and first referring to Fig. 1, the numeral 11 indicates a point emitter source of radiant heat energy, which energy may be of either visible or invisible frequency, depending on the character of the emitter, and which point 11 may be any emissive point of a physical radiant heat source. Assuming that point 11 is on the right hand surface of an emitter structure, suggested by dotted lines 12, it will be seen that radiant heat rays will be emitted in an infinite number of angularly different directions, forming a generally conical divergent beam.

In accordance with a fundamental concept of the invention, emitter 12 is enclosed by a casing structure 13, and the internal surfaces of the walls thereof are made highly reflective. By reason of radiant heat energy emission in an infinite number of directions from each emissive point of source 12, as 11, energy will impinge on the various portions of the reflective internal casing surfaces at an infinite number of different angles, and, the reflective internal surfaces of the different walls being angularly related to each other, the radiant rays will be reflected among them repeatedly. Plausible paths of a pair of rays emitted from point 11 at different angles are indicated by dash lines 14, 15 of Fig. 1.

In accordance with the theory outlined above, a portion of the heat energy of each ray, or of each successive wave, is abstracted by the reflective surface portion of the casing wall upon which it impinges, and the successive impingements of the wave upon different reflective surface portions of the casing walls as it is reflected from one to another such portion, successively abstracts incremental percentages of the heat energy of the ray, or of the successive waves. The total of such incrementally abstracted heat energy percentages is much greater than that which can be abstracted and absorbed by the non-reflective surfaces conventionally used for abstracting energy from radiant heat at a single impingement. The heat energy so abstracted is absorbed by the wall structure that is directly provided with the reflective surfaces, and appears therein as usable heat, resulting primarily in temperature rise of the casing wall structure 13. That absorbed heat is readily transmitted by conduction through the sheet metal of which the casing preferably is made, and is readily available at the outer surface of the latter for transfer to the medium to be heated.

The device does not function to accumulate heat in the interior casing by reflective isolation of the chamber from the wall structure enclosing it. Instead, wall structure 13 is arranged and related to the reflective surface system for the most efficient heat transfer practical from the reflective surfaces to the exterior of the casing. The outer surfaces of the casing may be arranged in any of various ways to aid in transfer of the heat to a medium to be heated.

Due to the necessity for efficient transfer of heat to outer surface of the casing, and to provide adequate resistance to the quite high temperatures that are developed at the inner reflective surfaces and in the casing structure, while so far as possible providing the best practical reflective inner casing wall surfaces, it is at present regarded as preferable practice to make at least substantial portions of the casing walls upon which radiant heat impinges of sheet metal of single thickness, and capable of receiving and maintaining a high degree of surface polish, without discoloration or dulling during long exposure to the temperature and atmospheric conditions that exist inside the casing chamber. Additionally, such material should have good thermal conductivity and mechanical resistance to distortion or weakening by prolonged subjection to temperatures at levels at which the device is to operate.

Experiment has shown stainless steel to be suitable for use in walls of casings of the kind in question insofar as stamina under prolonged heating is concerned. Stainless steel also is capable of receiving surface polish of reasonably good heat-reflective character, and maintaining such polish without serious discoloration or dulling during long exposure to temperature of several hundred degrees. Accordingly, sheet stainless steel is regarded as material suitable for use in constructing the casing, although it is entirely possible that investigation will show other metals, chrome-plated copper, for example, to be equally satisfactory mechanically and superior to stainless steel so far as reflective efficiency is concerned.

Figs. 4 and 5 show different forms of a device that represents an improvement of the elementary arrangement shown in Fig. 1. As in Fig. 1, the radiant heat energy source, designated 16 in Fig. 4, may be considered as having an infinite number of emissive surface points, as 17. Source 16 is enclosed by a system of reflective surface portions, including those provided by a side wall 18 laterally surrounding the space enclosing and faced by the emissive surface of source 16. Instead of a plane casing end wall facing the source emissive surface, as in Fig. 1, in Figs. 4 and 5, that surface is faced by portions 19 of the reflective system that are so angularly related to the major axis of the assembly, and axes that are normal to the emissive surface, and to the internal sidewall surfaces, as to direct to the latter such heat rays as impinge upon them in the general direction of these axes, thereby tending to direct to the reflective sidewall surfaces such heat rays as would be reflected back to the source by a plane end surface as in Fig. 1. Plausible paths of heat energy rays emitted by source point 17 in directions that differ angularly but extend generally toward the casing end, are shown at 21, 22 in Fig. 4. A plausible path of a ray emitted toward sidewall 10 is indicated at 23. It will be seen that each such ray path includes plural successive reflective impingements on different internal surface portions of the structure enclosing the chamber space faced by the emissive source surface. The sidewall 18 is assumed to be of sheet metal having the qualities outlined above as suiting it to the use in question, and particularly, having a highly reflective internal surface. Preferably the reflective surface portions 19 in an arrangement like those of Figs. 4 and 5 are arranged to distribute over the surfaces of side-wall 18 the heat rays that impinge upon the former directly from source 16, and to that end they may be formed in the general arrangement indicated, symmetrically distributed about the median axis of the emissive surface, and receding axially and radially from a center point and away from the source.

The structure providing the end portions 19 of the reflective surface system may be arranged in various ways. While that structure may be provided by suitable formation of the end wall of the casing itself, as shown at 24, Fig. 5, it is regarded as preferable, due to more ready formation of an efficient reflective surface arrangement, to provide an insert structure, as at 25, Fig. 4, and, to select the material that presents the reflective surface portions 19, with regard to superior heat-reflective qualities rather than from considerations of efficient conductive heat transfer through that structure. This is especially true in cases where the casing side-wall 18 forms transfer surfaces for heating a fluid medium flowing along them longitudinally of the casing.

Glass with metalized reflective surfacing is suitable for use in structure providing the surface portions, as 19, that face the emissive source and reflect the radiant heat to the reflective surface portions with which the casing side-wall is provided. Mirror stock capable of withstanding high temperature conditions is commercially available and is suitable for use in heat exchangers of the type herein disclosed. A certain amount of heat is abstracted from the energy waves reflected from a glass reflective structure, and a considerable percentage of that heat will be transmitted to the casing wall structure and so transferred from the casing interior to an enclosed medium to be heated, and such reflective surface-providing structures may be designed with the object of providing for reasonably efficient conduction of heat to the casing wall structure.

Figs. 6 through 9 disclose a preferred type of arrangement of structure providing reflective end surface portions of the general nature of those shown by Figs. 4 and 5. For abstraction of relatively high percentage of the heat energy of radiant heat waves, incrementally by multiple, successive reflective impingement, it is regarded as preferable that dispersion of the rays or of successive energy waves, at each reflection be limited as much as possible. Consequently, is is regarded as preferable to form the reflective surface system that accomplishes the multiple reflections, of non-dispersive character. This may advantageously be accomplished by making up the reflective surface system, so far as is practical, and with regard to necessity of providing efficient heat-conduction structure, of plural plane reflective surface portions angularly related to each other and to the emissive surface of the source to provide for a substantial number of successive reflections of a large percentage of the radiated heat energy waves. For accomplishment of these objects in practical fashion, the end portions of the reflective surface system may be made up of multiple, plane reflecting surfaces angularly related to each other, to the internal casing wall surfaces and to the emissive source surface, to reflect a large percentage of rays impinging upon them toward the casing wall surfaces. A generally dome shape arrangement of such multiple plane reflective surfaces is satisfactory.

In each of Figs. 6 and 7, the lateral side-wall 27 is formed of a single thickness of relatively thin sheet metal of good thermal conductivity and provided with an internal surface 28 that is reflective. Facing the effective emissive surface 29 of a source 30, which is shown as a conventional electric heater element, with an elongate heater element 31 mounted in grooves of a base 32, is a reflective surface-providing structure 33, formed of a plurality of plane mirrors 34, with the planes of their reflective surfaces angularly related to each other, to sidewall inner surfaces 28 and to the effective emissive surfaces, as described. In Fig. 6 the mirrors 34 form parts of a structure mounted inside the casing as an insert, and including a generally bowl-shaped base 35, suitably secured to the casing, as by brackets 36, and having mirrors 34 attached to it by a layer of cement 37. In Fig. 7 the very similar reflective end surface is provided by attachment of mirrors 34 direct to a suitably contoured casing end wall 38, as by cement layer 39.

Fig. 9 shows enlarged cross-section of such an assembly, supporting base wall 40 corresponding to either base support 35 of Fig. 6 or end wall 38 of Fig. 7, and the plane mirrors 34 being attached to the surface of wall 40 by a layer 41 of cement.

Mirrors 34 may have any desirable form of plan outline, suited to close edge-to-edge interfitting on a supporting surface that is contoured to support them in a specific selected arrangement of their reflective surface planes. Hexagonal mirrors arranged in a mosaic pattern, as in Fig. 8, form a suitable mirror arrangement.

As suggested by Fig. 2 and 3, a casing structure that surrounds and encloses the radiant heat source may have various cross-sectional shapes, the circular cross-section of casing 42 of Fig. 2, and the hexagonal cross-section of casing 43 of Fig. 3, being examples. Similarly, heat sources may take a variety of forms as shown at 44, 45 of Figs. 2 and 3.

The atmospheric condition of the emitter and reflective surface-containing chamber formed by the casing preferably is adjusted to minimize such effects as oxidation or other chemical deterioration of the heater element and reflective surfaces, and development of excessive internal pressure. Therefore, while the device will function effectively if provided with a simple air vent, as shown at 46 in Fig. 1, which will bleed pressure from the chamber, it is regarded as preferable to prevent entry of oxygen by at least partly evacuating the chamber and hermetically sealing it.

The arrangement is suitable for use with any type of heater that emits radiant heat energy. Such a heater is typified by conventional electric ribbon or coiled resistance wire heaters that become red hot and emit both visible and invisible frequency heat waves, but a heater that emits either kind exclusively is suitable for use in an arrangement embodying the invention.

The foregoing description has been largely based on the theory that heat energy is abstracted from radiant heat waves by impact or impingement, that such abstraction may be accomplished by a reflective surface, and that increments of heat energy so abstracted by repeated reflective impingements total a percentage of total radiated energy that is markedly greater than can be extracted by impingement of radiant heat waves upon a dull, dark colored surface. While this theory serves as a convenient base for explanatory disclosure, it is to be understood that it is not necessarily correct, either wholly or in part, and the invention properly is to be considered as involving physical arrangement of reflective surface portions in a system wherein they are so related to each other and to a radiant heat emitter as to produce successive multiple reflections of the heat waves, regardless of the detailed mechanics or nature of abstraction of heat energy from them and its transfer to usable heat in the casing structure.

Testing of the invention to obtain some indication of its utility was accomplished by means of the arrangements shown in Fig. 10, a jacket structure 51 having been arranged to enclose an air-heating chamber 52 provided with an inlet 53 and a delivery stack 54. A motor-driven fan 55 forced air through chamber 52 at a rate roughly controlled by axially positioning the fan. Test readings were made in delivery stack 54, of rate of air delivery and temperature of delivered air, air temperature rise having been obtained by comparison of delivery and inlet air temperatures. Temperature readings were taken after stabilization of delivery air temperature. From such readings, in the tests of the various arrangements now to be described, the recovery of heat from the heater element was calculated in terms of British thermal units per hour. Tests using a conventional one thousand watt electric heater element of coiled Nichrome wire spirally wound on an inverted cone base, as shown at 56, were conducted. A casing 57 of fourteen inch diameter and eighteen inch length, made of sheet stainless steel with commercially polished inner surface was used in each case. With a concave, polished stainless steel reflector 58 facing the inclined surfaces of heater 56, as shown in Fig. 10, and with a dome-shaped reflector of mirror facets, of the kind shown in Figs. 8 and 9, positioned at the opposite end of the casing chamber and facing reflector 58, as shown at 59, Fig. 10, the heat recovery rate was measured and calculated. With a second dome-shaped mirror-faceted assembly substituted for the concave steel reflector, as at 60 in Fig. 11, the heat recovery was also determined.

Using the same casing, and substituting for the thousand watt heater a seven hundred watt single-surfaced hot plate type of heater in the general arrangement shown in Fig. 12, with the heater at one end of the casing chamber and faced by a single dome-shaped, mirror-faceted reflector 62 facing it from the other end of the chamber, rate of heat recovery was again determined.

According to the conventional rating of heaters of the kind in question for air heating by direct radiation, of 3.413 British thermal units per watt per hour, the heaters employed in these tests would have produced much smaller maximum heat recoveries. By enclosing them in casings provided internally with reflective surface systems, efficiencies of these heaters, as measured by heat usefully recovered in air heating, were more than double.

I claim:

1. Heating apparatus comprising a source of radiant heat and a heat conductive metal casing completely closed against the ingress and egress of fluid providing highly polished reflective inner surfaces spaced from and completely surrounding said source, said casing defining a space which is completely unobstructed intermediate said source and inner surfaces and transparent to heat radiation, said surfaces being directly exposed to all rays emitted by said source, said casing providing an outer surface exposed to a medium to be heated, whereby heat will be transferred from said outer surface and said inner surfaces having a relative disposition producing a large number of successive reflections of said rays.

2. Heating apparatus as set forth in claim 1 wherein portions of said highly reflective suraces are faceted.

3. Heating apparatus as set forth in claim 1 wherein said casing is formed of a single thickness of sheet metal.

4. Heating apparatus as set forth in claim 1 wherein said casing includes peripheral and radial inner reflective surfaces.

5. Heating apparatus as set forth in claim 1 wherein said reflective surfaces include faceted convex portions.

6. Heating apparatus as set forth in claim 1 wherein said reflective portions include convex portions.

7. Heating apparatus as set forth in claim 1 wherein said casing is provided with opposed conical ends.

References Cited in the file of this patent
UNITED STATES PATENTS

| | | |
|---|---|---|
| 1,278,026 | Salto | Sept. 3, 1918 |
| 1,394,319 | McNeal | Oct. 18, 1921 |
| 1,563,562 | Gasser | Dec. 1, 1925 |
| 1,706,846 | Fisher | Mar. 26, 1929 |
| 1,754,232 | Fisher | Apr. 15, 1930 |
| 1,849,115 | Siers | Mar. 15, 1932 |
| 1,926,473 | Wood | Sept. 12, 1933 |
| 2,066,127 | Slayter | Dec. 29, 1936 |
| 2,377,177 | Pfleumer | May 29, 1945 |
| 2,379,820 | Mendez | July 3, 1945 |
| 2,613,328 | Embshoff | Oct. 7, 1952 |
| 2,767,297 | Benson | Oct. 6, 1956 |

OTHER REFERENCES

| | | |
|---|---|---|
| 437,996 | Great Britain | Nov. 8, 1935 |
| 484,199 | Great Britain | Apr. 28, 1938 |

UNITED STATES PATENT OFFICE

CERTIFICATE OF CORRECTION

Patent No. 2,908,795                         October 13, 1959

George E. Branstrom

It is hereby certified that error appears in the printed specification of the above numbered patent requiring correction and that the said Letters Patent should read as corrected below.

Column 7, line 23, beginning with "whereby heat" strike out all to and including "of said rays." in line 26, and insert instead:

and said inner surfaces having a relative disposition producing a large number of successive reflections of said rays, whereby heat will be transferred from said outer surface.

Signed and sealed this 19th day of July 1960.

(SEAL)

Attest:
KARL H. AXLINE
Attesting Officer

ROBERT C. WATSON
Commissioner of Patents